United States Patent [19]

Kaneda et al.

[11] Patent Number: 5,730,382

[45] Date of Patent: Mar. 24, 1998

[54] TAPPING BOSSES OF MAGNETIC TAPE CASSETTE

[75] Inventors: Hiroshi Kaneda, Nagano-ken; Masatoshi Okamura, Suku; Yasunori Ono, Oita-ken, all of Japan

[73] Assignee: TDK Corporation, Tokyo, Japan

[21] Appl. No.: 590,459

[22] Filed: Jan. 23, 1996

[30] Foreign Application Priority Data

Jan. 24, 1995 [JP] Japan ................................. 7-027256
Jan. 24, 1995 [JP] Japan ................................. 7-027257

[51] Int. Cl.$^6$ ........................ G11B 23/087; G11B 23/04
[52] U.S. Cl. ................................. 242/347; 360/132
[58] Field of Search ........................ 242/347, 347.2, 242/348; 360/132

[56] References Cited

U.S. PATENT DOCUMENTS 4,371,286  2/1983  Okamura et al. ........................ 403/407
5,440,439  8/1995  Rambosek et al. ........................ 360/132

*Primary Examiner*—John Q. Nguyen
*Attorney, Agent, or Firm*—Wood, Phillips, VanSanten, Clark & Mortimer

[57] ABSTRACT

A tape cassette including a cassette case consisting of an upper half and a lower half fastened together by at least one boss provided integrally on the upper half and at least one boss-receiving member provided integrally on said lower half. The boss includes an upper post and a plurality of first radial ribs projecting radially from the surface of the upper post and the boss-receiving member includes a lower post having a recess at its top end for receiving a projecting end of the boss, and the lower post is provided with a plurality of second radial ribs extending radially from the periphery of the lower post and said lower post has a minimum wall thickness around the recess sufficient to to connect the second radial ribs. The accuracy of the boss-receiving member is improved, the deviation of the total thickness of the upper and the lower halves which could otherwise occur is prevented, and the molding cycle can be shortened. The cassette further provides a lower half having a support rib of a reduced thickness for supporting a lock plate which is free of unsightly shrinkage mark due to imbalance of the thickness and yet has the same sufficient strength as the conventional thickness.

3 Claims, 7 Drawing Sheets 5,730,382

TAPPING BOSSES OF MAGNETIC TAPE CASSETTE

BACKGROUND OF THE INVENTION

The present invention relates to a magnetic recording tape cassette, and more particularly to means for improving the molding accuracy of video tape cassette case, particularly of areas of bosses for uniting or clamping together upper and lower halves of such cassette case and/or the area of a support rib for a lock plate of such cassette case.

PRIOR ART

In general, tape cassette such as video tape cassette or digital tape cassette has a construction as illustrated in FIG. 1, which comprises a cassette case composed of an upper half 40 and a lower half 50 made of rigid synthetic plastic material, a pair of reels 55 having a length of magnetic tape would thereon and encased in the cassette case and a front lid 57 mounted on the front end of the upper and lower halves 40 and 50. The tape is withdrawn from the front end when the front lid 57 is opened.

The upper and lower halves 40 and 50 of the conventional tape cassette are tightened together as shown in FIG. 2 by making lower ends of screw-receiving bosses 1 formed on the upper half 40 abut against upper ends of boss-receiving members 2 formed on the lower half 50 and tightening them by screws 9.

Referring to FIG. 2, each of the boss-receiving members 2 of the lower half 50 consists of a lower post 4 having a frusto-conical shape formed integrally with the base or bottom wall 3 of the lower half 50. A recess 6 is formed in the top end 5 of the lower post 4 and a through-hole 10 is formed between this recess 6 and an outer recess 8 in the outer surface of the bottom wall for receiving a head 7 of a screw 9 to allow the shaft 9 of the screw to pass through the hole 10. Each of the screw receiving bosses 1 of upper half 40 is provided with a frusto-conical upper post 12 and a snap-fit engaging protrusion 13 extending from the upper post 12 to make alignment of the upper and lower halves by entering the recess 6 of the lower post 4. The upper post 12 has a female thread hole 15 in which the male thread of the shaft 9 of the set screw is threaded.

The protrusion 13 is composed of a bifurcated cylinder of a thin wall thickness around the threaded hole 15 and having slots to form two piece members of crescent shape which are capable of flexing radially inwardly. Accordingly, the snap-fit protrusion 13 is formed to have a slightly larger diameter than the inner diameter of the recess 6 of the lower post 4 and the forward end of the protrusion 13 is first engaged with chamfered portion 16 of the recess 6 when the upper and lower halves are assembled together and then is resiliently deformed inwardly into the recess 6 to make snap-fit in the recess 6. The outer annular area of the lower end of the upper post 12 provides a shoulder 14 to abut against the top end 5 of the boss-receiving member 2 of the lower half.

As described in the foregoing, the lower post 4 has a chamfered edge area 16 for facilitating insertion of the snap-fit protrusion 13 of the upper boss 1 and accordingly the abutting shoulder 14 of the boss 1 must be in an area extending outwardly of the champered area. Accordingly, the end of the upper post 12 must be formed with a frusto-conical shape having a thickness larger than the the diameter which is necessary for accommodating the screw. Owing to the thick upper post, a large shrink mark 17 is formed on the outer surface of the base wall 11 at the foot of the upper post 12 during the injection molding. In order to solve the problem of this shrinkage, it is required to make smaller the diameter of the upper post 12 of the screw-receiving boss 1. However, if this is done, the surface area of the abut shoulder 14 does necessarily become smaller, with a result that the abutting engagement between the boss 1 and the boss-receiving member 2 is insufficient.

To overcome this problem, U.S. Pat. No. 4,371,286 (corresponding to JP-B-6-2805) was proposed. In this U.S. patent, the diameter of the upper post 12 of the screw-receiving boss 1' was, as shown in FIG. 3, made smaller than the conventional one into a diameter comparable to the protrusion 13 at the lower end and the outer surface of the upper post 12' is, instead, formed with an appropriate number of radial ribs 18 extending along the axis of the upper post 12. The radial ribs can serve as an abutting shoulder 19 for the lower post 4. This abutting shoulder 19 has a sufficiently large surface area and accordingly the abutting with the lower post 4 can be fully achieved and the problem of the shrinkage mark of molding is solved.

On the other hand, the cylindrical boss-receiving member 2 of the lower half remains thick as shown in FIG. 5(b) and FIG. 6 which shows the details of the inside of the circle 63 in FIG. 5(b) (FIG. 6(a) shows a plan view and FIG. 6(b) is a cross sectional view of FIG. 6(a)). However, the conventional cassette did not show the problem of shrinkage mark formation during molding operation because the recess 8 for the screw head 7 reduced the thickness of the boss-receiving member and the bottom wall 3 in the vicinity of the recess 8. Accordingly, the U.S. patent did not refer to shrinkage problem with respect to the boss-receiving member of the lower half.

The boss-receiving member of the lower half has a larger thickness than the other portions of the lower half as shown in FIG. 5(b) and FIG. 6, and accordingly, in an effort to reduce the thickness of the bottom wall and other portions to save the material cost and to reduce the molding cycle time (the time required for each injection operation), the boss-receiving member is subjected to deformation when the lower half is withdrawn from the mold because the boss-receiving member will not have been fully solidified by that time, and thus the boss-receiving member and the through-hole of the member is adversely affected, resulting in insufficient screw tightening and the total thickness of the assembled halves is out of the standard.

In this connection, U.S. Pat. No. 5,440,439 discloses a lower half having a cylindrical boss-receiving member provided with a plurality of inwardly projecting radial ribs extending axially along the inner wall of a recess to help accelerate the cooling of the boss-receiving member after molding (FIG. 3 of the patent). However, the radial ribs are provided to suppress the longer cooling time which results from making larger the thickness of the wall of the cylindrical boss-receiving member than the conventional boss-receiving member (see FIG. 4 of this patent) so as to make the diameter of the recess of the boss-receiving member smaller to allow the boss to snugly fit in the recess and thus there is no suggestion in this reference to adopt a smaller wall thickness than the conventional tape cassette case to shorten the molding cycle time. Moreover, as the radial ribs are formed within the recess, the portion of the boss-receiving member below the bottom of the recess remains thick and accordingly it is not possible to prevent shrinkage mark formation when the thickness of the bottom wall is reduced.

From the foregoing, those skilled in the art encountered the above problems in an effort to shorten the molding cycle time due to the insufficient solidification of the boss-receiving member which has a thicker wall than the other portions of the lower half in its vicinity. On the other hand, if a longer cooling period is adopted, the deformation of the member within the mold makes it difficult to remove the molded half from the mold.

Similar problems are present in a support rib for a locking plate. More specifically, as shown in FIGS. 4 and 11 (FIG. 11(a) is a plane view and FIG. 11(b) is a B—B cross section of FIG. 11(a), with locking plate removed for clarification), there is a lock plate support section 58 in which a lock plate 58 is housed for controlling the front lid 57 and is supported at a shaft 60 by an upright support rib 61 formed integrally on he lower half 50. The support rib 61 should have a sufficient strength to withstand various external forces or effects experienced during transportation, dropping test, or in high temperature conditions in order that the lock plate 58 satisfactorily performs a function of controlling the closing and opening of the front lid 57. This lock plate support rib 61 should give a support to the lock plate in such manner that the lock plate is properly operated to assure the open and close function of the front lid 57 in various external conditions such as transportation, dropping test, or a high temperature.

The recent design concept for production of tape cassette halves is the lighter weight with less resin since low cost tape cassettes are more and more demanded from the market. In order to switch to such light weight cassette halves, it is possible to design halves having thin walls for the most parts of the cassette but there are portions which cannot be made thinner from the standpoint of maintaining the necessary functions such as the support rib for the locking plate axis.

In such case, the thicker portions (the conventional thickness) form mass deviations from the other thinner portions which make the molding operation unbalanced, leading to insufficient filling of the mold with resin, poor parting property of the product from the mold, unsightly outer appearance of the product such as shrinkage. Accordingly, in such mixed presence of thin and thick portions, the convention molding operation is difficult to perform, a fine control of the molding conditions is required and a lowered productivity results due to the cycle-down of the molding operation.

If the lock plate shaft support rib is made similarly thin as the other parts of the lower half, insufficient strength of the portion and cracking during transportation or dropping test and deformation in high temperature conditions are predicted.

One proposal to solve this problem is disclosed in JP-A-3-130079 in which the lower portion of the support rib for the locking plate axis is bifurcated or divided into two plates having thinner wall thickness than the upper portion of the rib, to eliminate the shrinkage problem. It is true that this construction solves the conventional problems but introduces a new problem in that a pin of a slide core of the mold used for forming this bifurcated portion is often broken due to over-filling of resin or due to handling during molding operation, the mold handling is difficult and the productivity is lowered.

Accordingly, a principal object of the present invention is to provide a tape cassette in which the accuracy of a boss-receiving member of a lower half is improved, the deviation of the total thickness of the upper and the lower halves which could otherwise occur is prevented, and the molding cycle time can be shortened.

Another object of the present invention is to provide a cassette half having a support rib of a reduced thickness for supporting a rock plate and having a bottom wall free of unsightly shrinkage mark due to imbalance of the thickness and yet has the same sufficient strength as the conventional thickness, whereby the locking plate can maintain its proper function even after transportation or dropping test.

SUMMARY OF THE INVENTION

The tape cassette according to the present invention comprises a a cassette case consisting of an upper half and a lower half fastened together by at least one, preferably three, bosses provided integrally on the upper half and at least one, preferably three, cylindrical boss-receiving members provided integrally on said lower half, each of said boss including an upper post and a plurality of first radial ribs projecting radially from the surface of the upper post and each corresponding one of said boss-receiving members including a lower post having a recess at its top end for receiving a projecting end of the boss, characterized in that said lower post is provided with a plurality of second radial ribs extending radially outwardly from the outer periphery of the lower post and said lower post has a minimum wall thickness around the recess sufficient to connect the second radial ribs.

Each boss and each boss-receiving member respectively having the first and second radial ribs are provided at rear corners of the cassette case and at a front center of the cassette case.

Preferably, the second radial ribs are formed along about 50–80% of the height of said lower post. Here, the height is measured from the top surface of a recess formed in the under surface of the bottom wall of the lower half.

According to the present invention, since the cylindrical boss-receiving member of the lower half is modified into a lower post of a reduced diameter sufficient to eliminate the heat shrinkage during injection molding and a plurality of radial ribs extending radially outwardly from the outer periphery of the lower post, heat radiation is accelerated after injection molding operation and accordingly the molding cycle time can be shortened without fear of deviation of the axis of the boss-receiving member from the regular vertical position.

The present invention further provides a tape cassette including a cassette case consisting of an upper half and a lower half mated together, a front lid pivotally mounted on a front end of the cassette case, a lock plate for locking the front lid to retain it in a closed position, and a support rib for a shaft of the lock plate, characterized in that the support rib is comprised of a main rib and at least one cross rib extending normal to said support and extending along the main rib and said main rib has a thickness less than that required if there is no cross rib.

The at least one cross rib may be a long cross rib alone extending from a bottom wall of said lower half to near the top of said main rib.

Preferably, the at least one cross ribs contain a short cross rib attached to lower portion of said main rib as well as a long cross rib extending from the bottom wall of the lower half to near the top of the main rib.

With the thickness the same as or comparable to the thinned wall around the reel areas and thinned side walls, localized thick portion or deviation of thickness of the support rib for the lock plate is minimized and thus the problem of unsightly heat shrinkage mark is solved. Also, the integral cross lib strengthens the support rib for the axis of the lock plate against various external forces to secure the proper function of the lock plate.

BRIEF DESCRIPTION OF THE DRAWINGS

FIG. 3 shows a boss-receiving member of lower half of a conventional but improved tape cassette, in which

FIG. 5 shows the conventional cassette shown in FIG. 2 in which

FIG. 6 shows the boss-receiving of the conventional tape cassette in which

FIG. 7 illustrates the boss and boss-receiving member of the tape cassette according to the present invention in which

FIG. 9 illustrates the portion of the support rib for the lock plate of the tape cassette according to the present invention in which

FIG. 11 illustrates the conventional lock plate support rib in which

DESCRIPTION OF PREFERRED EMBODIMENTS

Figure 1:
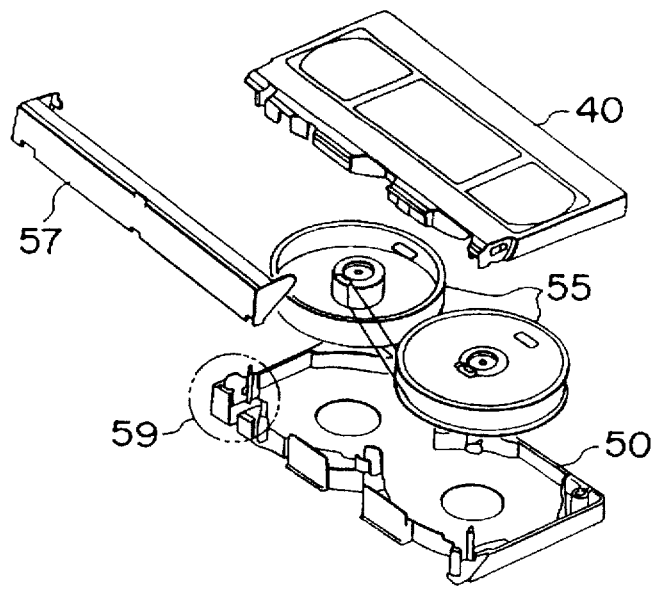
FIG. 1 shows an exploded perspective view of a general tape cassette.
Figure 2:
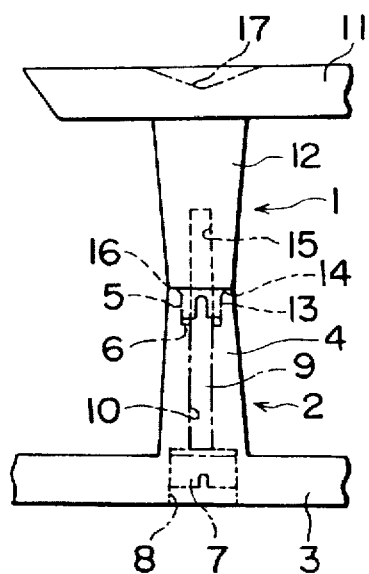
FIG. 2 is a side view of a boss for screw clamping of upper half and a boss-receiving member of lower half of the conventional tape cassette in combination.
Figure 3A:
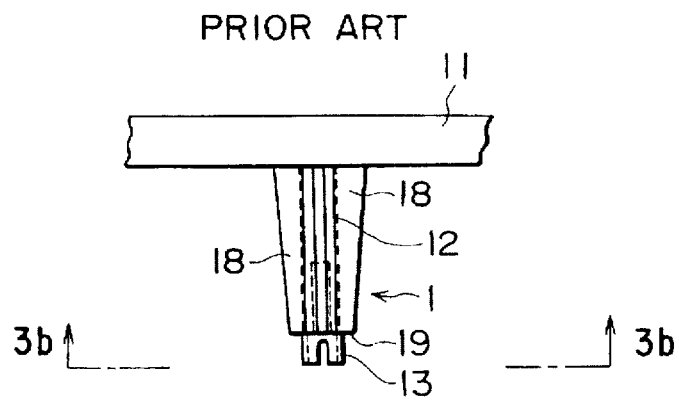
FIG. 3(a) is a side elevational view and FIG. 3(b) is a cross sectional view taken along the line A—A of (a)
Figure 3B:
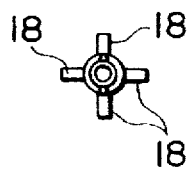
Figure 4:
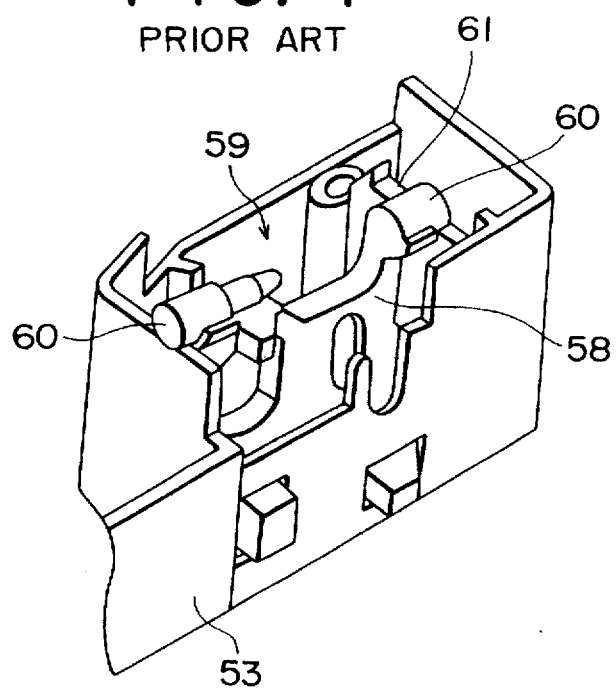
FIG. 4 is an enlarged view of a lock plate housing area of the conventional tape cassette which corresponds to the portion indicated by the reference numeral 59 in FIG. 1.

Preferred embodiments of a tape cassette according to the present invention will now be explained in detail by making reference to the accompanying drawings in which the parts or members similar to the corresponding parts or members of the conventional cassette will be indicated by the same reference numerals.

First Embodiment (Boss-receiving member)

Figure 7A:
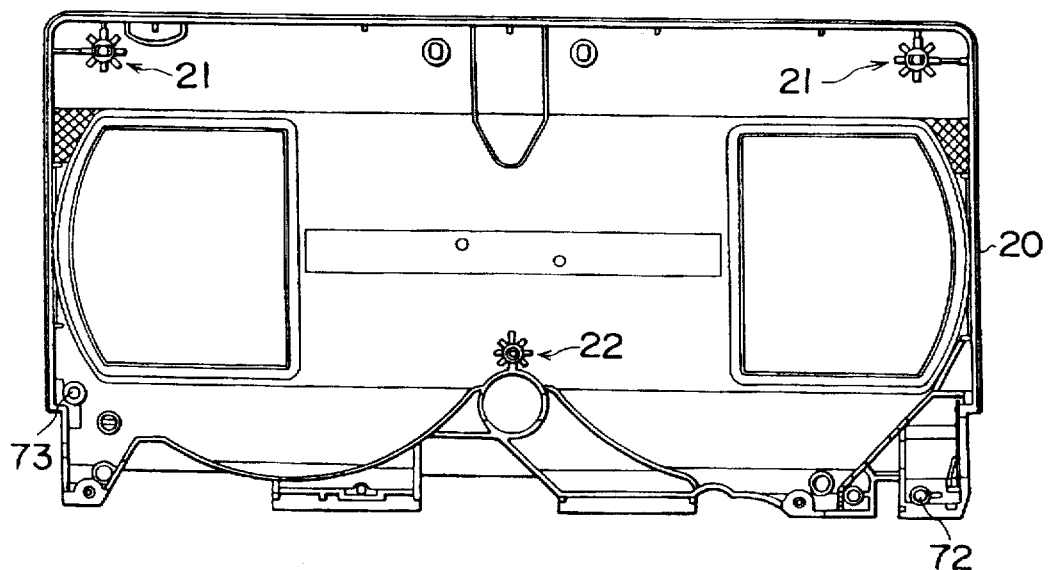
FIG. 7(a) shows a bottom view of the upper half and FIG. 7(b) is a plan view of the lower half.
Figure 7B:
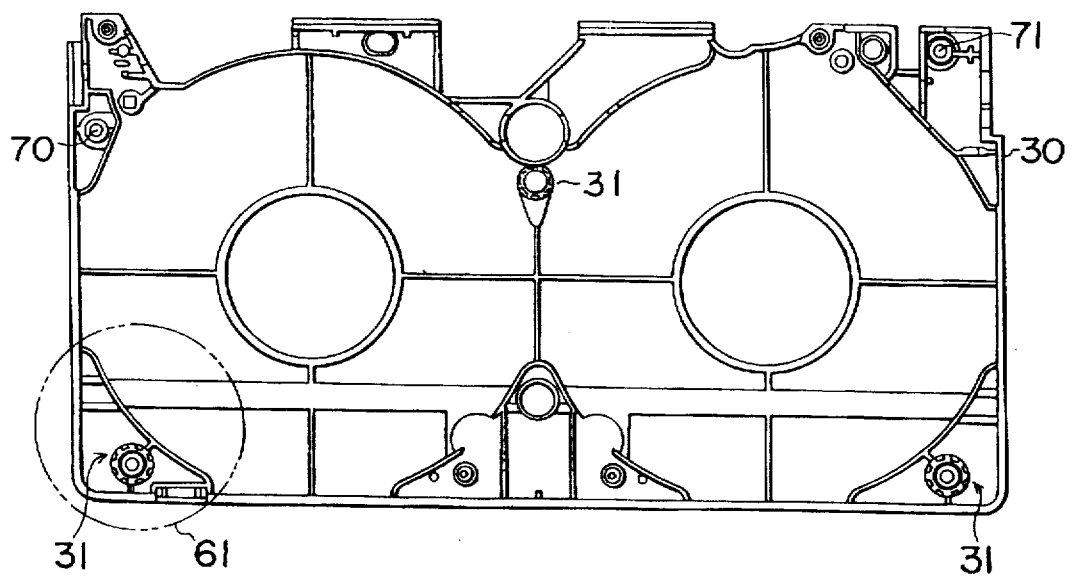
Figure 8A:
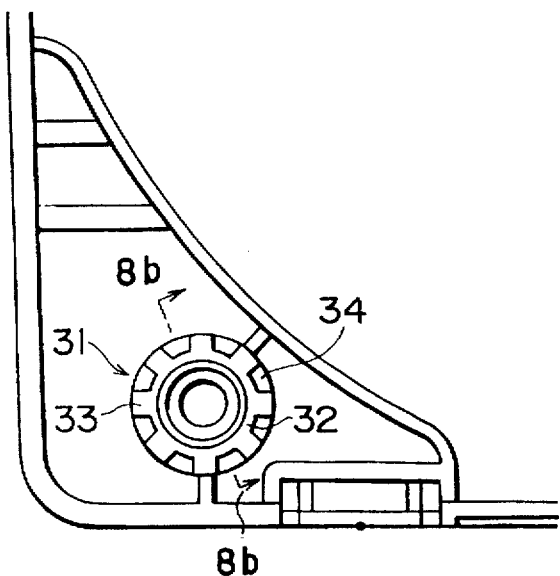
FIG. 8(a) is an enlarged view of the circle 61 in FIG. 7(a) and FIG. 8(b) is a cross sectional view taken along the line C—C of FIG. 8(a)
Figure 8B:
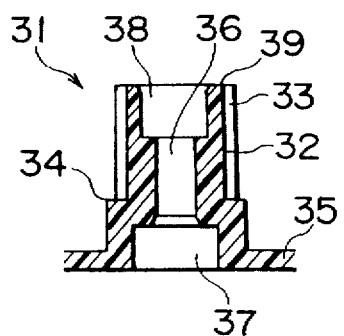

FIG. 7 illustrates a boss and a boss-receiving member of a tape cassette according to one embodiment of the present invention in which FIG. 7(a) shows a bottom view of the upper half and FIG. 7(b) is a plan view of the lower half. FIG. 8 is an enlarged view of the inside of the circle 61 in FIG. 7(a) and FIG. 7(b) is a cross sectional view taken along the line C—C of FIG. 7(a).

The tape cassette according to the present invention includes a lower half 30 and three upright boss-receiving members 31 integrally formed on the a bottom wall of the lower half 30. Each of the boss-receiving members 30 is composed of a thin cylindrical lower post 32 having a through-hole 36 for a screw to be inserted and a plurality of radial ribs extending outwardly from and axially along the lower post 32.

Figure 5A:
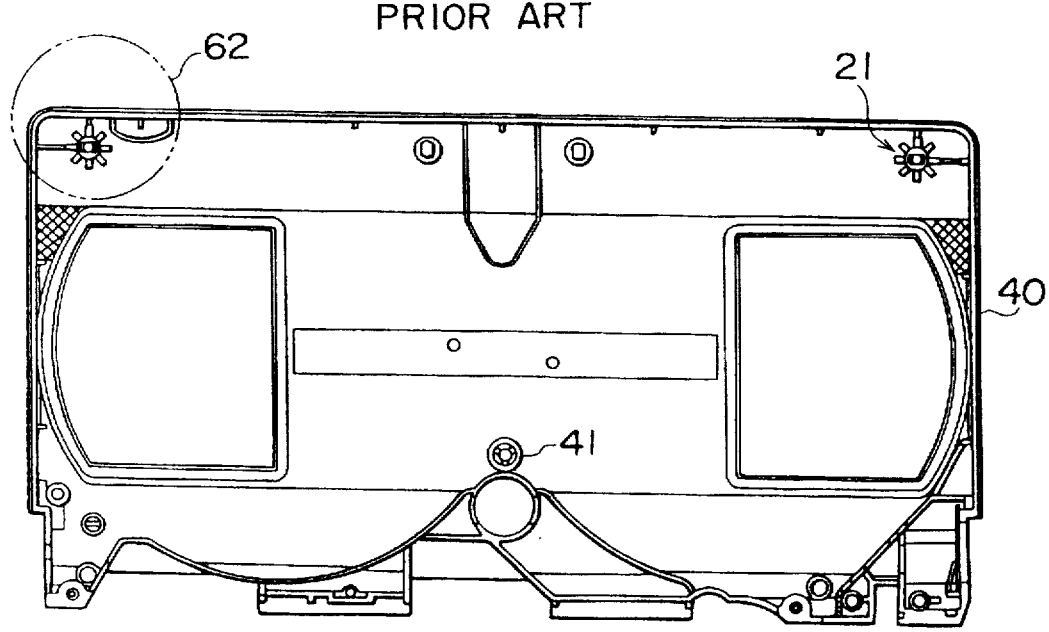
FIG. 5(a) is a bottom view of the upper half for showing the boss for clamping a screw and FIG. 5(b) is a plan view of the lower half.
Figure 5B:
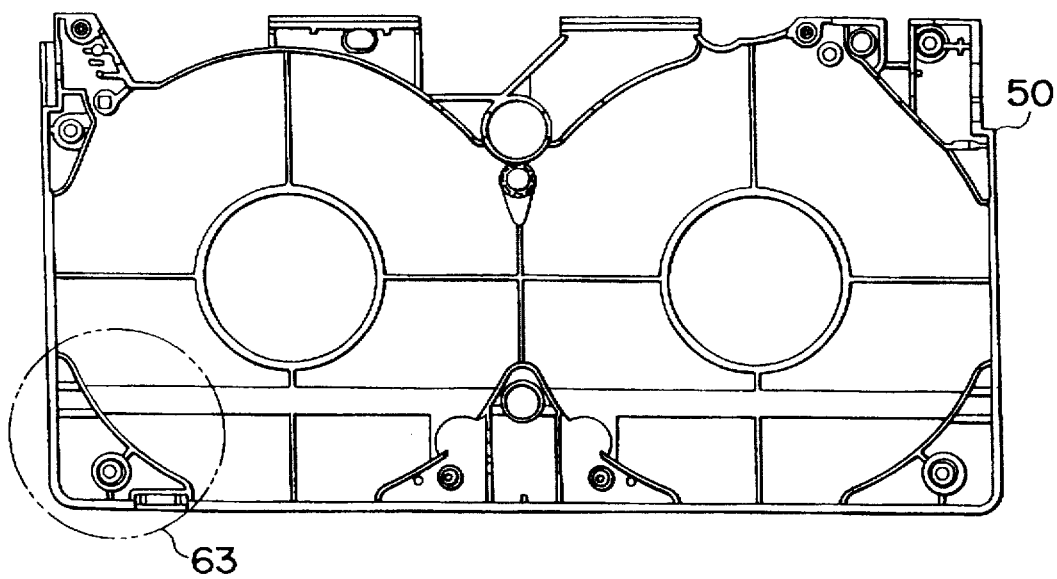
Figure 6A:
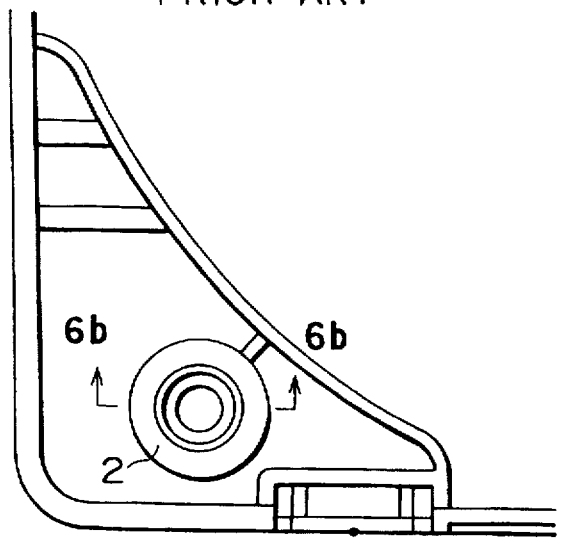
FIG. 6(a) is an enlarged view of the portion indicated by the circle 63 in FIG. 6(b) and FIG. 6(b) is a cross sectional view taken along the line B—B of FIG. 6(a)
Figure 6B:
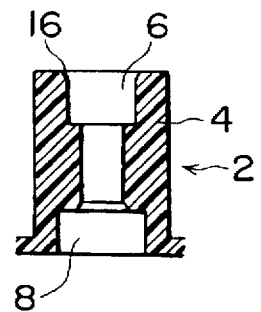

The cassette also includes an upper half 20 and a boss 22 at the center of the cassette for receiving a set screw as well as bosses 21 on both rear corners of the cassette as shown in FIG. 7(a). Each of the bosses 21 and 22 is comprised of a thin upper post and a plurality of radial ribs extending axially along the outer surface of the upper post. The constructions of these bosses 21 and 22 are similar to the conventional ones as disclosed in Japanese Utility Model Kokai No. 61-2805 which is shown in FIG. 5(a).

Next, the constructions of the three boss-receiving members 31 which are adapted to mate with the bosses 21 and 22 of the upper half when assembled will be explained in detail by making reference to FIG. 8. Each of the boss-receiving members 31 comprises a cylindrical base portion 34 extending upwardly from the bottom wall 35 of the lower half 30 and being provided with a recess 37 in the under surface to house the head of a set screw (not shown), a cylindrical lower post 32 contiguous to and extending upwardly from the base portion 34 and having a through-hole 36 for passage of the set screw, and a plurality of radial ribs 33 extending outwardly from and axially along the outer surface of the lower post. The lower post 32 is provided with a recess 38 opening upwardly to snugly receive the protrusion 13 at the end of the upper post 21 or 22 of the upper half 40. The upper edge of the recess 36 is usually chamfered to help fit the protrusion 13 into the recess 38. The diameter of the lower post 32 must be sufficiently thin to promptly remove the heat of the molten resin during injection molding operation but should have such a thickness that it can securedly support the radial ribs. An accurate relative positioning and aligning of the upper and the lower halves are effected by the three bosses 21 and 22 and the boss-receiving members as the protrusions 13 of the bosses fit snugly into the recesses 38 of the boss-receiving members. Other fastening means are also required but does not constitute a part of the present invention. The upper end of the lower post 32 and the upper ends of the ribs 33 form an abutting surface 39 which is engaged with the lower end surface of the upper post 12 of the boss 21 or 22. If the radial ribs are so formed to align and abut with each other when the upper and the lower halves are assembled, there is provided a sufficient abutting area necessary for clamping together the upper and the lower halves although the thickness of the lower post has been significantly reduced.

Incidentally, the protrusion 13 and the recess 38 may or may not have snap-fitting relationship although close fitting is necessary.

Instead of using screws for clamping the upper and the lower halves together, a welding technique such as ultrasonic welding at the abutting surface 39 may be used. In this case, the through-hole 36 in the lower post 32 may be dispensed with. However, if this option is adopted, the recess 38 or the recess 37 or both must be deep enough to be close to each other so as not to leave a thick wall portion.

It should be noted that the radial ribs 33 preferably occupy 50%–80% of the height of the lower post 32. The height of the lower post 32 is defined as a height measured from the top surface of the recess 37 as seen from FIG. 8(b).

With this construction in which the thickness of the wall of the lower post of the boss-receiving member 31 is reduced and a plurality of the radial ribs 33 are integrally formed on the outer peripheral surface of the lower post 32, the cooling after injection molding is accelerated, the molding cycle time can be reduced without causing the boss-receiving member 31 from slanting from the regular vertical position and formation of unsightly shrinkage mark on the outer surface of the bottom wall 35 is also prevented.

The conventional VHS cassette case and the cassette case of the embodiment were tested and compared with each other. The results are shown in the following table, in which the symbols indicate the followings.

Deviation of boss-receiving member from the vertical position (slant).

○: no slant, Δ: slight slant with fitting with boss, X: significant slant and no fitting with boss.

Deformation of the through-hole for the screw:

○: no deformation, Δ: slight deformation with fitting with boss X: no fitting with boss Thickness variation:

○: within standard (2.5±0.2 mm), Δ: upper limit, X: outside of the standard.

Further, the molding conditions were the same as the conventional injection molding except for the molding cycle time. The conditions A and B represent molding cycles one second and two second shorter than the currently used cycle time, respectively.

TABLE 1

|  | Current cycle time | | Condition A | | Condition B | |
| --- | --- | --- | --- | --- | --- | --- |
|  | Prior art | Exmpl. | Prior art | Exmpl. | Prior art | Exmpl. |
| Slant of Boss-rec. mem | Δ | ○ | X | ○ | X | ○ |
| Deform of through-hole | Δ | ○ | X | ○ | X | ○ |
| Thickness | ○ | ○ | Δ | ○ | X | ○ |

From this table, it is understood that the lower half according to the present invention makes it possible to reduce the cycle time for injection molding by about two seconds.

Thus, according to the composition of the present invention the accuracy of the boss-receiving member is assured and accordingly the accuracy of the cassette case comprised of the assembled upper and lower halves is secured with reduced cycle time. Also, since the injection molds can be used as high cycle molds, the cost performance is also improved.

Second Embodiment (Support rib for lock plate shaft)

Nest, an embodiment of the support rib for a lock plate shaft according to the present invention will be explained in detail in reference to FIGS. 9–10.

Figure 9A:
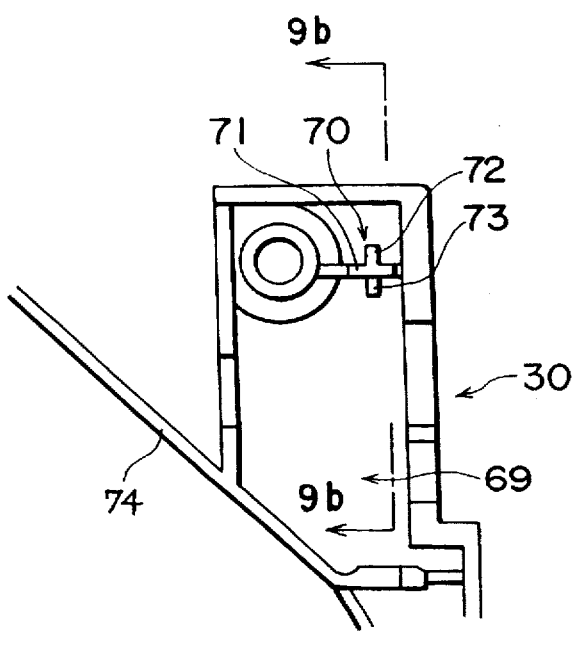
FIG. 9(a) is a plane view and FIG. 9(b) is a cross sectional view taken along the line A—A in FIG. 9(a)
Figure 9B:
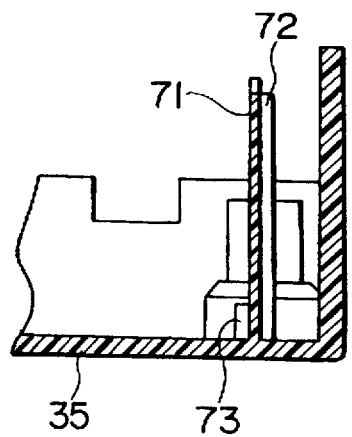
Figure 10:
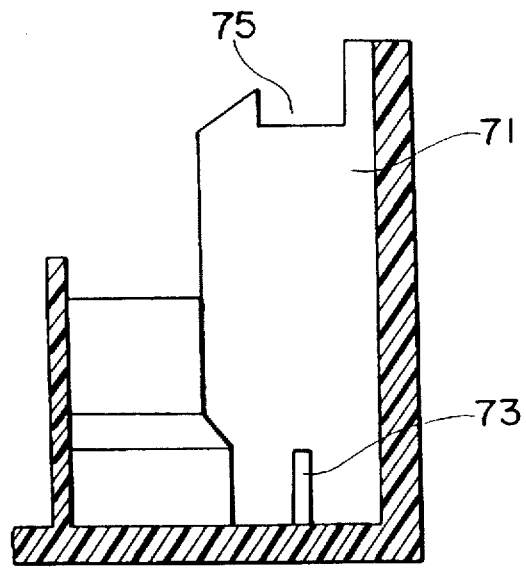
FIG. 10 is a cross section taken along the line C—C of FIG. 8(b)

FIG. 9 illustrates the portion of a support rib for a lock plate of the tape cassette according to the present invention in which FIG. 9(a) is a plane view and FIG. 9(b) is a cross sectional view taken along the line A—A in FIG. 9(a). The lock plate is not shown for ease of understanding. FIG. 10 is a cross section taken along the line C—C of FIG. 8(b).

Figure 11A:
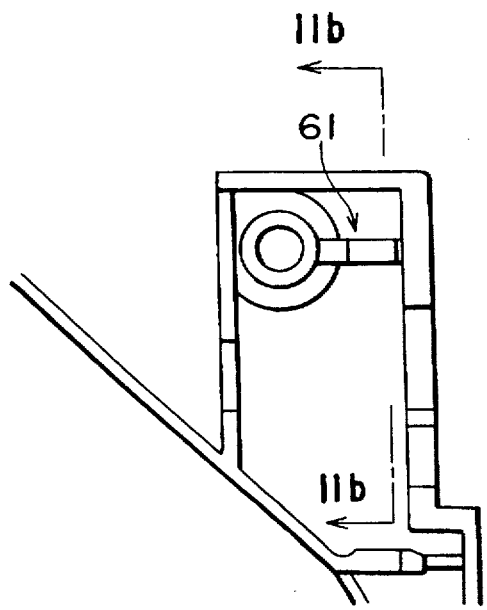
FIG. 11(a) is an enlarged plan view of the lock plate housing area including the the lock plate support rib and FIG. 11(b) is a side elevational view taken along the line B—B of FIG. 11(a).
Figure 11B:
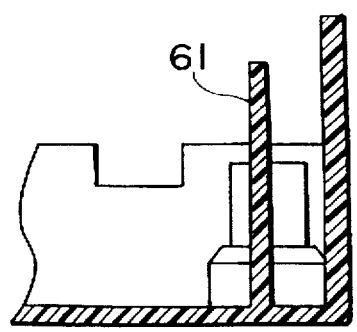

A support rib 70 for a shaft of a lock plate according to this embodiment includes a main rib 71 having a thin thickness which, as will be easily understood from comparison with the conventional support rib 61 shown in FIG. 11, is approximately one half of the conventional one. To compensate for the strength of the thin main rib 71, cross ribs 72 and 73 are integrally formed which extend substantially normal to the main rib.

As shown in FIG. 9(b), the main rib 70 is integral with the bottom wall 35 of the lower half 30 and extends vertically in the upward direction. The main rib 71 supports at the top a shaft of a lock plate (not shown). As seen from FIG. 10, the main rib 71 has a recess 75 at the top end in which the shaft of the lock plate is received and held in position. The main rib 71 is thinned to reduce the amount of resin so as to reduce the material cost as well as the process cost by reduction of the cycle time for injection molding.

The cross rib 72 extends from the bottom plate 35 of the lower half 30 along one surface of the main rib 71 to near the top of the main rib 71. The cross ribs 72 and 73 are preferably in alignment with each other. The rib 73 is much shorter than the rib 71 for leaving room for the lock plate but should extend from the bottom plate 35 along the other surface of the main rib 71 to give a sufficient strengthening effect to the main rib 71. It was found that the strength of the main rib 71 is sufficient with these two cross ribs 72 and 73 not only to prevent the main rib from slanting from the vertical position during molding but also to maintain the main rib in position in use.

By way of example, the main rib 71, the long cross rib 72 and short cross rib 73 have almost the same thickness as that of the reel housing areas 74 of the cassette case and have a thickness of about 0.7–0.8 mm.

The conventional support rib 61 had to have a large thickness because the support rib has a significantly large height. Also, there was a problem of the shrinkage mark on the external bottom surface because the support rib 61 has a thick base portion to give the support rib 61 a taper for removal from the molding mold. According to the present invention, the support rib 70 is comprised of the thin main rib 71 which is strengthened by the cross ribs 72 and 73 and thus the thickness of the support rib 70 is reduced approximately in half while maintaining the strength of the support rib 70 required for supporting the shaft of the lock plate.

By this thinned wall thickness of the support rib 70, the imbalance in the thickness in the process of reducing thickness is removed and the necessity of delicate adjustment of the injection molding conditions is eliminated, the problem of shrinkage mark formation is solved and reduction of the molding cycle time is achieved.

The present invention has been described in connection with preferred embodiments but those skilled in the technical field to which the present invention pertains may consider various modifications without departing from the technical idea of claimed invention.

What we claim is:

1. A tape cassette including a cassette case consisting of an upper half and a lower half fastened together by at least one boss provided integrally on the upper half, at least one boss-receiving member provided integrally on the lower half and a fastening means to unite the boss and the boss-receiving member, said boss including an upper post and a plurality of first radial ribs projecting radially from the surface of the upper post and said boss-receiving member including a lower post having a recess at the top end of said boss-receiving member for receiving a projecting end of the boss, characterized in that said lower post is provided with a plurality of second radial ribs extending radially from the periphery of the lower post and said lower post has a minimum wall thickness around the recess sufficient to connect and securedly support the second radial ribs, said second radial ribs extending along about 50–80% of the height of said lower post when said height is measured from a top surface of an outer recess formed below said boss-receiving member in an under surface of a bottom wall of the lower half, each of said second radial ribs being aligned with and abutting one of the first radial ribs.

2. A tape cassette according to claim 1, wherein said boss and said boss-receiving member respectively having the first and second radial ribs are provided at rear corners of the cassette case and at a front center of the cassette case.

3. A tape cassette including a cassette case consisting of an upper half and a lower half fastened together by at least one boss provided integrally on the upper half, at least one boss-receiving member provided integrally on the lower half and a screw to unite the boss and the boss-receiving member, said boss including an upper post and a plurality of first radial ribs projecting radially from the surface of the upper post and said boss-receiving member including a lower post having a first recess at the top end of said boss-receiving member for receiving a projecting end of the boss, characterized in that said lower post is composed of a cylindrical base portion extending upwardly from the lower half and provided with an outer recess for a head of the screw, a cylindrical lower post extending upwardly from the base portion and having a through-hole for passage of the screw and a plurality of second radial ribs extending radially from the periphery of the lower post and said lower post is thin enough to give a minimum wall thickness around the recess sufficient to connect and securedly support the second radial ribs, said second radial ribs extending along about 50–80% of the height of said lower post when said height is measured from a top surface of an outer recess formed below said boss-receiving member in an under surface of a bottom wall of the lower half, each of said second radial ribs being aligned with and abutting one of the first radial ribs.

\* \* \* \* \*